United States Patent Office 3,053,683
Patented Sept. 11, 1962

3,053,683
PIGMENT, METHOD OF MAKING SAME, AND COATING COMPOSITIONS CONTAINING SAME
Seymour Yolles, Drexel Hill, Pa., assignor to E. I. du Pont de Nemours and Company, Wilmington, Del., a corporation of Delaware
No Drawing. Filed Sept. 19, 1958, Ser. No. 761,962
3 Claims. (Cl. 106—290)

This invention relates to novel shiny pigments having particular utility in the production of coating compositions which yield glittery finishes, i.e. surface coatings which sparkle with bright discrete beams of reflected light.

Flakes of aluminum and other metals and alloys have long been used as reflective pigments. Coating compositions containing such known metallic flakes can be applied to various substrates to yield surface coatings having more or less of a metallic sheen or more or less of a glittery appearance depending on the amount and character of the flaky pigment. But such pigments are known to tarnish, corrode and/or induce gas evolution in liquid coating compositions and they are known to become dull in surface coatings exposed to the weather during service.

This invention has as its primary object the provision of new and useful shiny pigments of improved brilliance which are suitable for use in making glittery-finishes and which have improved resistance to tarnishing, corroding, gassing and/or dulling.

Another object is to provide methods of making such pigments and coating compositions therefrom.

Other important objects will become apparent from the following description of the invention.

Improved shiny pigments are made in accordance with this invention by placing a quantity of smooth pigment or pigment-like particles in a closed space and subjecting them to the vapors of a vaporizable thermally-decomposable organometallic compound while the compound is subjected to heat or other conditions which decompose it, whereby a smooth bright film of metal is deposited on the particles.

The glittery-finish coating compositions of this invention are made by dispersing a thus-prepared shiny pigment in a film-forming material, optionally in the presence or absence of conventional components of coating compositions.

The invention is illustrated but not liimted by the following examples, in which the quantities are expressed on a weight basis unless otherwise indicated.

*Example 1*

This example illustrates a preferred method of making a shiny pigment in accordance with this invention.

A "Pyrex" glass tube measuring one inch inside diameter and 25 inches in length, and having one end open, is mounted in a horizontal position. Three grams of dibenzene chrominum crystals are placed in the tube near the closed end. The middle 6 inches of the tube are filled to a depth of about ½ inch with 325 mesh, 0.08 mil-thick glass flakes of mirror-like smoothness ("Flakeglas" C), with a retaining wad of glass wool at both ends of the flake area.

After attaching the open end of the tube to a vacuum pump, air is evacuated from the tube until the pressure therein is equivalent to about 0.25 mm. of mercury. Two sleeve-type electrical heaters are mounted around the evacuated tube, one at the section enclosing the dibenzene chromium and the other at the section enclosing the glass flake. While the tube is rotated slowly on its axis (about 60 r.p.m.) to agitate the glass flakes, the glass flake section is heated to an interior temperature of 510°–560° C. which is held for 5 minutes to remove any volatile substances present. Then, while continuing to rotate the tube and heat the glass flake section at 510°–560° C., the dibenzene chromium section is heated to an interior temperature of 130°–160° C. to vaporize the dibenzene chromium. As the dibenzene chromium vapor comes in contact with the hot glass flakes and the hot interior surface of the middle section of the tube, it decomposes or dissociates into chromium metal and benzene. The metal deposits on the glass flakes and the interior surface of the tube as a bright adherent film. The benzene passes out of the tube via the vacuum line and is condensed in a cold trap.

After the evacuated tube containing the dibenzene chromium and glass flakes is heated as described for 8 hours, it is cooled to room temperature and air is allowed to enter. The chromium-coated glass flakes are then removed and found to be surprisingly brilliant and suitable for use as a shiny pigment in glittery-finish coating compositions, as demonstrated in Example 10 et seq.

The shiny pigment produced in this example contains about 3% by weight of chromium. The film of chromium covering the flakes has a thickness of about 0.004 mil.

Useful but less uniform coating of glass flake with chromium is accomplished when rotation of the tube is omitted from the above example.

Color modifications of the product of this example are achieved by heating it and then cooling in a controlled atmosphere. For example, a shiny brilliant green pigment is produced by placing 0.5 gram of the product in a platinum crucible, heating in an electric furnace at about 650° C. for 10 minutes, and cooling at the rate of about 20 degrees per hour in an atmosphere of 10% oxygen and 90% argon. The tinted product has better resistance to solvents and fading than dye-tinted flake pigments.

*Example 2*

Two shiny pigments of this invention are made by repeating Example 1 except that aluminum flake is substituted for the glass flake, and the flake section of the evacuated tube is heated for one hour to remove volatiles before vaporizing the dibenzene chromium. The aluminum flakes used are 325 mesh and 400 mesh aluminum flake pigments.

The chromium-coated aluminum flake pigments produced in this example are brighter and shinier than the original aluminum pigments and are suitable for making improved glittery-finish coating compositions.

*Example 3*

Shiny chromium-coated mica pigments which have excellent brilliance and are useful in glittery coatings are made by repeating Example 1 except for employing in place of the glass flake 325 mesh mica flakes.

*Example 4*

A shiny chromium-coated glass pigment is prepared by mixing 3 grams of dibenzene chromium crystals with 8 grams of oven-dried coarse glass flake ("Flakeglas" E, about 170 mesh), placing the resulting mixture in a ¾ inch by 10 inch side-arm test tube, evacuating the air from the tube to a pressure of about 0.20 mm. of mercury, filling the unoccupied space in the tube with argon gas to atmospheric pressure, and heating the tube for 2 hours at 500°–550° C. while constantly sweeping out the liberated benzene with a slow stream of argon. In order to avoid oxidation of the pigment during cooling, it is cooled within the tube in an argon atmosphere.

In a modification of this example, the tube is sealed shut after it is evacuated and filled with argon gas. Consequently, during the subsequent heating, the pressure within the tube is superatmospheric. A shiny pigment is produced at the elevated pressure and in the presence of the liberated benzene.

*Example 5*

A shiny pigment similar to the product of Example 1 is obtained by repeating the general procedure of Example 1 except for having argon gas at substantially atmospheric pressure present during the deposition period. The reaction tube is fitted with a stopcock and flowmeter at the end adjacent to the dibenzene chromium for the introduction of argon gas. The tube containing the dibenzene chromium and glass flakes is evacuated and the glass flakes are preheated for 5 minutes as described in Example 1. Then argon gas is fed into the tube until atmospheric pressure is restored therein. A slow stream of argon is passed through the tube as the dibenzene chromium section is heated to 135° to 175° C. and chromium is deposited on the glass flake as described in Example 1. As the chromium deposition progresses, a mixture of benzene vapor and argon passes from the opposite end of the tube through a condenser for the benzene. From here the argon can be recycled through the reaction tube.

*Example 6*

Results similar to those obtained in Example 1 are obtained by repeating that example with the exception that, in place of dibenzene chromium, a different bis-arene metal compound is used, namely bis-biphenyl chromium.

*Example 7*

A shiny pigment similar to the product of Example 1 is prepared by repeating that example with the exception that, in place of dibenzene chromium, a different bis-arene metal compound is used, namely dibenzene molybdenum.

*Example 8*

A shiny pigment is produced by thermally decomposing nickel carbonyl gas in the presence of heated glass flake as follows:

A "Pyrex" glass tube 1 inch in diameter and 12 inches long, horizontally mounted and fitted at both ends with a stopcock, is loaded in a 6-inch-long central portion to a depth of ½ inch with oven-dried 325 mesh smooth glass flake. At both ends of the flake area is placed a retaining wad of glass wool. The air in the tube is replaced with argon gas at atmospheric pressure. Then, as the tube is slowly rotated to tumble the glass flakes, the flake section of the tube is heated to 210°–230° C. for 10 minutes. A slow stream of nickel carbonyl gas is then started and continued for about 5 hours through the heated rotating tube while the glass flake is held at 210°–230° C. The inside of the tube is at substantially atmospheric pressure throughout the process. The carbon monoxide liberated in the decomposition reaction is passed out of the tube into a liquid nitrogen trap. The resulting shiny nickel-coated glass flake is useful as a pigment in coating compositions.

*Example 9*

A shiny pigment is produced by thermally decomposing vaporized triethylaluminum in the presence of heated glass flake as follows:

Example 8 is repeated through the step of heating the glass flakes in an argon atmosphere, the temperature in this case being 400°–450° C. Then vaporized triethylaluminum is introduced into the tube from a distillation flask of boiling triethylaluminum. The vaporized compound is passed into the tube for about 3 hours, during which the heating and rotation are continued, and substantially atmospheric pressure is maintained within the tube. About 0.002 mil of aluminum is deposited on the glass flake. The organic byproducts of the decomposition reaction pass out of the tube into a condenser.

*Example 10*

A glittery finish air-drying coating composition is made by mixing the shiny pigment produced in Example 1 with a resinous film former and other ingredients in accordance with the following formula:

| | Parts by wt. |
|---|---|
| 52% soya oil modified alkyd resin | 46.00 |
| Metallic drier (Co, Pb, Mn naphthenates) | 0.04 |
| Shiny pigment of Example 1 | 4.60 |
| Hydrocarbon solvents | 49.40 |
| | 100.04 |

A film of the resulting composition is applied to a panel of black glass by means of a 10 mil doctor blade. When dried in air overnight, the coating sparkles with numerous bright discrete beams of reflected light. The panel has a unique glittery finish of extraordinary attractiveness. The liquid composition does not evolve gas during storage. Gas evolution is characteristic of liquid coating compositions containing conventional shiny aluminum flake pigments dispersed in the same or similar vehicles which carry traces of acid and water as a result of their method of manufacture.

Compositions similar to the product of this example result when the other shiny pigments produced in the foregoing examples are substituted for the pigment used in this example.

*Example 11*

A decorative upholstery material is made by top-coating a conventional upholstery-grade polyvinyl chloride-coated fabric with the following coating composition:

| | Parts by wt. |
|---|---|
| 12% solution of polyvinyl chloride (Geon 101) in methyl ethyl ketone | 50.0 |
| 25% solution of polymethyl methacrylate in methyl ethyl ketone | 20.0 |
| Shiny pigment of Example 2 (325 mesh) | 1.0 |
| Methyl ethyl ketone | 29.0 |
| | 100.0 |

A knit cotton fabric calender-coated on one side in a conventional manner with the pigmented upholstery-quality polyvinyl chloride composition disclosed in Example IV of U.S. 2,801,949 is used as the substrate. The above-described topcoat composition is applied by means of a doctor-roller to the coated side of the coated fabric in sufficient amount to yield a dry coating weight of 0.7 ounce per sq. yd. After the topcoat is dried in a heat zone (100° C.), the coated product has unusual eye-appeal because of its particulate or star-like sparkle. An embossed pattern is applied to the resulting product according to conventional practice of the coated fabric art thereby adapting it particularly for use as an upholstery material.

*Example 12*

An emulsion coating composition is made by thoroughly mixing the following:

| | Parts by wt. |
|---|---|
| 38% aqueous dispersion of finely divided polymethyl methacrylate ("Rhoplex" B–85) | 23.83 |
| 46% aqueous dispersion of a finely divided copolymer of about 34 parts methyl methacrylate, 64 parts ethyl acrylate, and 1 part methacrylic acid ("Rhoplex" AC–33) | 71.50 |
| Anionic dispersant (sodium salt of carboxylated polyelectrolyte "Tamol" 731) | 0.47 |
| Shiny chromium-coated glass pigment of Example 1 | 4.20 |
| | 100.00 |

This metallic emulsion paint has no apparent tendency to evolve gas during storage and is therefore safer and more convenient than metallic emulsion paints containing conventional aluminum pigments which tend to gas.

A film of this composition, diluted with water to about 150% of its original volume and filtered, is applied to a panel of black glass by means of a 5.6 mil doctor blade. The coating is air dried for 10 minutes and finally baked at 65° C. for 2 hrs. The finished panel has an attractive glitter and sparkle, particularly in daylight.

Similar results are obtained when the chromium-coated aluminum pigments produced in Example 2 are substituted separately for the glass-based pigment in the above example. In these cases a substantial reduction in the amount of gassing of the coating compositions on standing is observed when compared with an analogous composition made by substituting conventional aluminum flake in the same emulsion coating formula. In fact, on standing for 24 hours, the compositions containing the new pigments of Example 2 liberate only about one-fifth as much gas as the one containing conventional aluminum pigment.

*Example 13*

A glittery-finish acrylic lacquer is made by mixing the following:

| | Parts by wt. |
|---|---|
| Polymethyl methacrylate (lacquer grade) | 30 |
| Benzyl butyl phthalate (plasticizer) | 10 |
| Shiny pigment of Example 1 | 4 |
| Solvent (70% toluene, 30% acetone) | 56 |
| | 100 |

The resulting blend is ball-milled for 24 hours, then it is thinned to spraying viscosity with a suitable lacquer thinner (40% acetone, 30% toluol, 20% petroleum hydrocarbon, 3.3% amyl alcohol, 6.7% "Cellosolve" acetate). A coat of the thinned lacquer is sprayed on a steel automobile body panel which has previously been coated with a green acrylic automotive lacquer. The coated panel is force-dried at 85° C. for 30 minutes. Because of its star-like sparkle and rich color-contrast, the finished panel is strikingly attractive. The coating composition of this example is useful for embellishing a wide variety of painted consumer products, particularly automobiles, where novel appearance is desired.

*Example 14*

A colored glittery-finish automobile lacquer is made by grinding the following formula in conventional paint grinding apparatus:

| | Parts by wt. |
|---|---|
| Polymethyl methacrylate (lacquer grade) | 15.54 |
| Nitrocellulose (lacquer grade) | 2.34 |
| Benzyl butyl phthalate | 7.35 |
| Maroon pigment | 5.04 |
| Organophili clay (dimethyldioctadecylammonium bentonite) | 1.51 |
| Shiny pigment of Example 1 | 3.26 |
| Solvent (70% toluene, 30% acetone) | 64.96 |
| | 100.00 |

The resulting lacquer is thinned with a lacquer thinner to spraying viscosity. A coat of the thinned lacquer is sprayed on a primed steel panel and dried in a 65° C. oven. The finished panel has a durable glittery finish of unusual beauty characterized by bright discrete beams of reflected light.

*Example 15*

A glittery vitreous finish is applied to an aluminum base by first fusing and pulverizing a frit made from the following formula in accordance with standard ceramics industry practice:

| Oxide of: | Parts by wt. |
|---|---|
| Lead | 13.8 |
| Silicon | 49.4 |
| Lithium | 6.2 |
| Sodium | 18.3 |
| Potassium | 2.0 |
| Titanium | 9.9 |
| Antimony | 0.4 |
| | 100.0 |

Ten parts of the shiny pigment produced in Example 1 are blended with 100 parts of the above-produced pulverized frit, and the resulting blend is ball-milled with sufficient water to form a paste of conventional vitreous coating consistency. A coat of the ball-milled paste is spread on the aluminum base and fired in a 980° F. furnace containing an argon atmosphere. Because of its unique glittery appearance, the fired vitreous coating is unusual. Metal and ceramic ware enamelled in this manner is useful in kitchen and bathroom fixtures, tile, refrigerator cabinets and the like where the unique appearance is advantageous.

It is to be understood that the present invention is not limited to the specific embodiments set forth in the working examples, the claimed improvement relating generally to the advantages of decomposing a vaporized organometallic compound in the presence of smooth flake-like pigmentary particles while the latter are in an innocuous environment; sufficient compound being used to deposit a metallic film on the particles.

The chemical composition of the particles is not critical, the only requirements being that the substance be insert to chemicals present and be firm and solid during the process and during subsequent use. The particles must be smooth or capable of becoming smooth during the coating process so that the metal coating is smooth, whereby the characteristic shininess is obtained.

The shape of the particles is important in achieving maximum product brilliance. Preferably, the particles should be flat, such as flakes or platelets. Shiny but less brilliant products are obtained with other shapes, such as hemispheres, spheres, cubes and dished, cupped or otherwise curve-surfaced particles.

Particle size is not critical, the common range of pigment particle sizes being suitable. It is preferable to use particles in the range of about 140–325 mesh. Finer or coarser particles can be used according to the texture of glitter desired in the ultimate use. For example, particles as coarse as 50 mesh provide shiny products that can be sprinkled on a wet adhesive to make greeting cards and decorative articles. Particles so fine that substantially all pass through a 400 mesh screen can be used for fine textured glitter. The mesh size numbers correspond to the sieve numbers of A.S.T.M. Designation E11–39.

Useful particles, in addition to the highly preferred glass flakes and aluminum flakes, are exemplified by flaked mica, graphite, molybdenum disulfide, boron nitride, and bronze.

The organometallic compound from which the metallic coating is deposited onto the particles can be one or a mixture of such compounds capable of decomposing to yield a metal when subjected to heat or an equivalent form of energy.

Particularly preferred are the bis-arene metal compounds (also called complexes) in which two neutral aromatic organic molecules are bonded to a single metal atom of zero valence (zero oxidation number). Chemical union of the metal with the aromatic molecules does not involve the substitution of metal for hydrogen or of any other substituent on the aromatic molecule. Chromium is the preferred metal in such compounds, but the metal can also be molybdenum, tungsten or vanadium. Among the more useful aromatic molecules in the compound are benzene, cumene, biphenyl, mesitylene, naphthalene and tetrahydronaphthalene. Bis-arene metal compounds containing a metal having a valence other than zero can also be used when the metal component is released by reduction (e.g. as in the case of dibenzene iron iodide) or by disproportionation (e.g. as in the case of dibenzene vanadium tetrachloroaluminate) of the corresponding organometallic cation.

A second group of organometallic compounds which can be used in practicing this invention are the transition metal carbonyls and hydrocarbonyls, especially nickel carbonyl.

A third group of useful organometallic compounds are the alkyl derivatives of aluminum, cadmium or tin. An example is triethylaluminum. The alkyl component preferably contains less than 8 carbon atoms. Phenyl derivatives of these metals, such as triphenyl aluminum, are also useful.

In the deposition process of this invention, during the step in which the vaporized organometallic compound is decomposed in the presence of the particles, the vaporized compound and the particles should be in an enclosure or chamber which is substantially free of oxygen to avoid discoloration of the coating and combustion of organic materials. However, a controlled amount of oxygen is permissible, particularly during the latter stages of deposition, where a somewhat colored coating is desired. A vacuum chamber or a vessel filled with an inert gas such as argon, krypton, xenon or another rare gas is especially suitable.

The pressure within the chamber during deposition can vary over a wide range from an almost complete vacuum to super atmospheric pressure. Using a reduced pressure has the advantage of facilitating cleaning the particles and vaporizing the compound.

Agitation of the particles during metal deposition, although not essential, tends to improve the efficiency, quality and uniformity of coating. The particles can be agitated by any convenient method, such as by tumbling, ball milling, or gas turbulence.

In order to decompose the organometallic compound it is preferably heated to at least its decomposition temperature. Decomposition and the resulting deposition of metal can also be accomplished by subjecting the compound to energy other than heat, such as ultra violet light, X-rays, high frequency electricity, and beams of electrons, protons or alpha particles.

The essential components of the glittery-finish coating compositions of this invention are a novel shiny pigment as described herein and a film former which acts as a binder or matrix. During application of the coating composition to a substrate, the film former can be for example in the form of a solution, emulsion, dispersion, paste, fusible powder or molten mass. Especially useful are the organic film-forming materials commonly used in the paint industry, such as drying oils, oleoresinous varnishes, cellulose nitrate, cellulose-fatty acid esters, cellulose-lower alkyl ethers, elastomers, natural resins such as rosin and shellac, and synthetic resins, both thermoplastic and thermosetting, such as oil modified alkyd resins, vinyl resins, acrylic resins, phenol-aldehyde resins, amino aldehyde and epoxy resins. The ratio of shiny pigment to film former can vary widely depending upon the desired appearance, but the usual ratio is in the range of 1:100 to 1:1 by weight, preferably in the range 1:20 to 1:5.

In addition to the essential shiny pigment and film former, the glittery-finish coating compositions of this invention can also contain additives and modifiers which are well known and widely used in the coating art such as volatile solvents for the film former, dyes and pigments, plasticizers, surface active agents, stabilizers, thickeners, driers and catalysts. The proportions of these are not critical. They can be varied widely within the principles practiced in the art to yield the desired effects.

The coating compositions of this invention are useful for providing a glittery finish on articles made from a wide variety of substrates, including metal, wood, paper, fabric, plastic, rubber, plaster, cement, asphalt, glass and ceramics. Typical uses for these new glittery finishes are enriching the appearance of coated products, enhancing the attention-drawing power of signs and displays, and making high-visibility highway markings and other safety devices.

The shiny pigments of this invention, besides being useful in glittery finishes, are also useful as decorative pigments in or on plastic castings and moldings, and in or on other products now employing such known garnishing pigments as pearl essence and metal flakes.

While there are disclosed above only a limited number of specific embodiments of the structure, process and product of the invention herein presented, still other embodiments can easily be made within the inventive concept which is limited only as set forth in the appended claims.

I claim:

1. A method of making shiny metal-coated glass flake pigment which method comprises decomposing in a closed vessel a gaseous thermally-decomposable organometallic compound in the presence of smooth discrete glass flakes having a particle size of about 50–400 mesh, whereby a bright coating of metal is deposited on said flakes, said organometallic compound being a bis-arene metal compound in which two neutral aromatic organic molecules of the class consisting of benzene, cumene, biphenyl, mesitylene, naphthalene and tetrahydronaphthalene are bonded to a single metal atom of the class consisting of chromium, aluminum, molybdenum and nickel.

2. A method of claim 1 wherein said organometallic compound is dibenzene chromium.

3. A method of claim 1 wherein said flakes are agitated during the decomposition of said organometallic compound.

References Cited in the file of this patent

UNITED STATES PATENTS

| | | |
|---|---|---|
| 2,368,161 | Rubner | Jan. 30, 1945 |
| 2,387,243 | Castor | Oct. 23, 1945 |
| 2,602,033 | Lander | July 1, 1952 |
| 2,699,415 | Nachtman | Jan. 11, 1955 |
| 2,743,196 | Robinson | Apr. 24, 1956 |
| 2,887,406 | Homer | May 19, 1959 |
| 2,941,894 | McAdow | June 21, 1960 |

FOREIGN PATENTS

| | | |
|---|---|---|
| 665,831 | Great Britain | Jan. 30, 1952 |

OTHER REFERENCES

Cline et al.: Journal of the Electrochemical Society, vol. 98, No. 10, October 1951, pages 385–387.